United States Patent

Radscheit et al.

[11] 3,900,502
[45] Aug. 19, 1975

[54] PROCESS FOR THE MANUFACTURE OF DELTA 14-20-KETO-21-DIALKOXY STEROIDS

[75] Inventors: Kurt Radscheit, Kelkheim, Taunus; Ulrich Stache, Hofheim, Taunus; Werner Fritsch, Neuenhain, Taunus; Werner Haede, Hofheim, Taunus, all of Germany

[73] Assignee: Hoechst Aktiengesellschaft, Frankfurt am Main, Germany

[22] Filed: June 30, 1971

[21] Appl. No.: 158,566

Related U.S. Application Data

[63] Continuation of Ser. No. 816,066, April 14, 1969, abandoned.

[30] Foreign Application Priority Data

Apr. 18, 1968   Germany............................ 1768226

[52] U.S. Cl.................... 260/397.47; 260/239.55 C
[51] Int. Cl.². ........................................ C07C 169/32
[58] Field of Search ............................... 260/397.47

[56]             References Cited
              UNITED STATES PATENTS
3,682,987   8/1972   Radscheit et al. ............. 260/397.47

*Primary Examiner*—Elbert L. Roberts
*Attorney, Agent, or Firm*—Curtis Morris & Safford

[57]                ABSTRACT

$\Delta^{14}$-20-keto-21-dialkoxy steroids are prepared by oxidizing 20-keto-15$\alpha$,21-dihydroxy steroids of the general formula

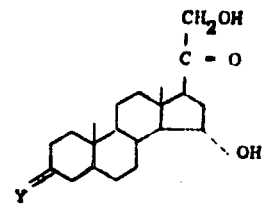

in which Y is an oxo group which may be ketalized, a

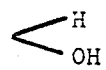

group which may be etherified or esterified, a $\Delta^3$-, $\Delta^2$-, or $\Delta^{3,5}$-enol ether group or a $\Delta^3$-, $\Delta^2$-, or $\Delta^{3,5}$-enamino group, which groups may have a double bond in the 4-position, and

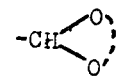

is a lower acyclic or cyclic acetal grouping, acetalizing the 15$\alpha$-hydroxy-20-keto-21-oxo steroids obtained, reacting the 15$\alpha$-hydroxy-20-keto-21-dialkoxy steroids thus obtained with sulfonic acid halides and treating the 15-sulfonic acid esters thus obtained with agents splitting off acids. The products are valuable intermediates for the manufacture of medicaments.

3 Claims, No Drawings

PROCESS FOR THE MANUFACTURE OF DELTA 14-20-KETO-21-DIALKOXY STEROIDS

This application is a continuation of Ser. No. 816,066 filed Apr. 14, 1969 now abandoned.

The present innvention relates to a process for the manufacture of $\Delta^4$-20-keto-20 -dialkoxy steroids of the general formula I

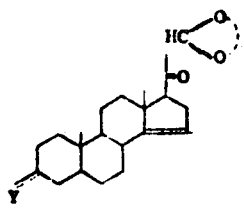

in which Y is an oxo group which may be ketalized, a

group which may be etherified or esterified, a $\Delta^3$-, $\Delta^2$-, or $\Delta^{3,5}$-enol ether group or a $\Delta^3$-, $\Delta^2$-, or $\Delta^{3,5}$- enamino group, which groups may have a double bond in the 4-position, and

is a lower acyclic or cyclic acetal grouping.

The process of the present invention comprises oxidizing 20-keto-5$0\alpha$,21-dihydroxy steroids of the general formula II

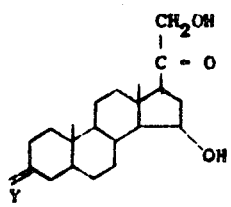

acetalizing the 15$\alpha$-hydroxy-20-keto-21-oxo steroids obtained, reacting the 15$\alpha$-hydroxy-20-keto-21-dialkoxy steroids thus obtained with sulfonic acid halides and treating the 15-sulfonic acid esters thus obtained with agents splitting off acids.

The reactions proceed, for example, according to the following formula scheme:

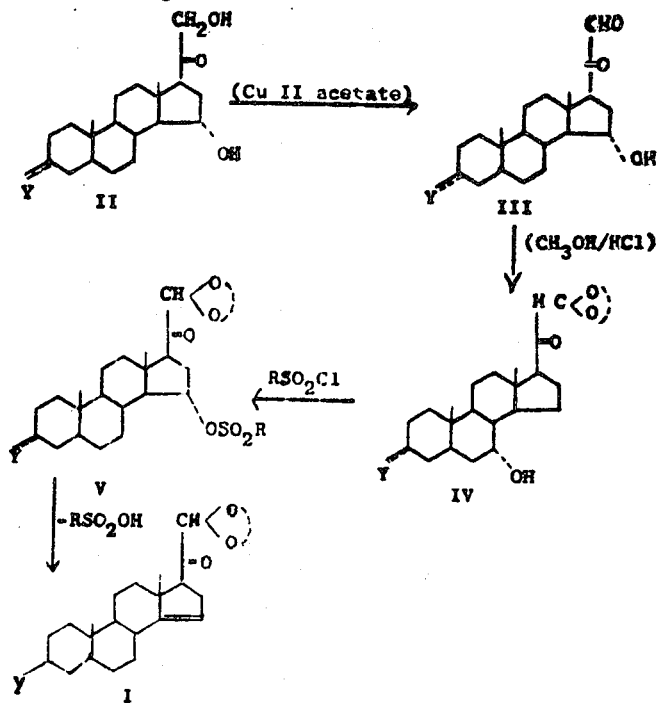

in which R is lower alkyl or aryl.

As starting materials there may be mentioned the following steroids:

5$0\alpha$-hydroxy- $\Delta^4$-pregnen-21-ol-3,20-dione, 15$\alpha$-hydroxy-5-$\beta$-pregnan-21-ol-3,20-dione, 15$\alpha$-hydroxy-5$\alpha$-pregnan-21-ol-3,20-dione, furthermore, the 3-ketals, 3-thioketals, 3-enamines, 3-enol ethers and 3-enol esters thereof.

There may furthermore be used:

15$\alpha$,3-dihydroxy- $\Delta^4$-pregnen-21-ol-20-one, 15$\alpha$,3-dihydroxy-5$\alpha$-pregnan-21-ol-20-one, in which the 3-hydroxy group may be in $\alpha$- or $\beta$-position, as well as the derivatives thereof esterified or etherified in the 3-position.

As carboxylic acids to be used for esterifying the 3-hydroxy group, there may be mentioned aliphatic saturated or unsaturated carboxylic acids having 1 to 20 carbon atoms, for example formic acid, acetic acid, propionic acid, palmitic acid, stearic acid, oleic acid; aromatic carboxylic acids, for example benzoic acid; araliphatic carboxylic acids such as phenylacetic acid and cycloaliphatic carboxylic acids such as cyclohexane-carboxylic acid.

As radicals to be used for etherifying the 3-hydroxy group there may be mentioned lower aliphatic alkyl radicals, for example methyl or ethyl; cycloaliphatic alkyl radicals, for example cyclohexyl; araliphatic alkyl radicals, for example benzyl and $\beta$-phenylethyl as well as optionally substituted tetrahydropyranyl radicals.

As enol ether, enol ester and enamine derivatives of the above-mentioned 3-keto steroids, derivatives having lower alkyl groups may be mentioned, for example methyl or ethyl, and as thioketal derivatives there may be mentioned those of lower alkane-dithiols, for example ethane-dithiol.

To ketalize the 3-keto group, monohydric aliphatic alcohols are used, for example methanol or ethanol; araliphatic alcohols, for example benzyl alcohol; and dihydric alcohols, for example ethylene glycol and neopentyl glycol.

To obtain the 20-keto-21-oxo-15α-hydroxy steroids of the formula III, the 20 keto-15α,21-dihydroxy steroids of the formula II are oxidized by means of oxidizing agents generally used in steroid chemistry, preferably by means of copper(II) acetate in aqueous methanol under weakly acid conditions, for example in the presence of a small amount of acetic acid, at temperatures of from 40° to 60°C under atmospheric pressure. It is also possible to oxidize by means of air or oxygen in the presence of an oxidation catalyst, preferably copper(II)acetate, or metal salts soluble in alcohols, for example salts of copper and iron, for instance iron(III)-chloride.

The 21-acetals of the general formula IV may be prepared from the cited steroid compounds of the general formula III by reacting the latter with an alcohol necessary for ketalization as a solvent or additive in the presence of an acid catalyst, for example hydrogen chloride, at boiling temperature for a period of from 1 minute to 4 hours, preferably 2 hours. For the acetalization of the aldehyde group in 21-position, monohydric aliphatic alcohols, for example methanol and ethanol, araliphatic alcohols, for example benzyl alcohol, and dihyoric alcohols, for example ethylene glycol and neopentyl glycol, are used.

If, in these reactions hydrolizable groups, for example ketal, ether, ester, enol ether, enol ester or enamine groups, have been hydrolized, these groups may subsequently be introduced, where required, according to generally used methods.

The 15α20-keto-21-dialkoxy steroids of the general formula IV so obtained are reacted with sulfochlorides such as methane-, benzene- or toluene-sulfochloride in the presence of a tertiary base, preferably pyridine, where required in an inert organic solvent, for example acetone, benzenes or tetrahydrofurane. The reaction is carried out at temperatures of from −10°C to the boiling point of the solvent used, preferably at 0° to 20°C. The reaction period ranges from 5 to 20 hours and depends on the reaction temperature or the sulfochlorides used.

The 21-dialkoxy-20-keto-15α-sulfonates of the general formula V are then treated with agents splitting off sulfonic acids, for example with collidine, pyridine, lithium chloride and/or lithium carbonate/dimethylformamide or glacial acetic acid/sodium acetate, preferably lithium carbonate/dimethylformamide, at temperatures between 20°C and the boiling temperature of the solvent used. The reaction period is 1 minute to 12 hours; it generally is 20 to 45 minutes if, for example, boiling dimethylformamide is used.

The process of the present invention is surprising since, for example, it was not to be expected that the oxidation of the 21-hydroxy group can be carried out without the 15α-hydroxy group being affected and that the subsequent acetalization proceeds under acid conditions without causing undesired side reactions, for example dehydration, rearrangement or etherification, of the 15 α-hydroxy group that is unstable to acids.

The products obtained according to the process of the invention are valuable intermediates for the manufacture of medicaments, especially of bufadienolides effective against heart diseases, as disclosed in Belgian Pat. No. 716,698.

The following examples serve to illustrate the invention, but they are not intended to limit it thereto.

EXAMPLE 1 a. 15 α-hydroxy-3,−20,21-trioxo- $\Delta^4$-pregnene 10 g. of 15 α-hydroxy-desoxycorticosterone were dissolved at 60°C in 200 ml of methanol and 0.46 ml of glacial acetic acid, 15.8 g of Cu(II)acetate and further 154 ml of hot 80 percent methanol were added successively. After stirring for 20 minutes at 60°C, the solution was suctionfiltered, the filtrate was stirred with Lewatit S 100 (treated with 4N-hydrochloric acid) until decoloration, the solution was once more filtered off, concentrated in vacuo, combined with water and extracted with ethyl acetate. After washing to neutral and drying over $Na_2SO_4$, the mixture was evaporated to dryness. 10 g of amorphous 1560 -hydroxy-3,20,21-trioxo- $\Delta^4$-pregnene were obtained. Infrared bands: 3,400 $cm^{-1}$, 1,710–1,720 $cm^{-1}$, 1,650—1,670 $cm^{-1}$ and 1,610 $cm^{-1}$.

b. 15α-hydroxy-3,20,21-trioxo-$\Delta^4$-pregnene-21-dimethylacetal 23 g of 15α-hydroxy-3,20,21-trioxo-$\Delta^4$-pregnene were refluxed in 525 ml of 1 percent-methanolic hydrochloric acid for 2 hours, then after cooling the solution was poured into 440 ml of saturated potassium carbonate solution and freed in vacuo from methanol. The precipitate was filtered off, washed to neutral with water and dried over $P_2O_5$ at 40°C in vacuo. 18.8 g of 15α-hydroxy-3,20,21-trioxo- $\Delta^4$-pregnene21-dimethylacetal were obtained, m. p., 124°–127°C. Infrared bands: 3,400 $cm^{-1}$, 1,710–1,720 $cm^{-1}$, 1,650–1,760 $cm^{-1}$, 1,610 $cm^{-1}$, 1,100 $cm^{-1}$, 1,070 $cm^{-1}$.

c. 15α-hydroxy-3,20,21-trioxo-$\Delta^4$-pregnene-15α-tosylate-21-dimethyl-acetal 18.8 g of 15α-hydroxy-20,21 -dioxo-$\Delta^4$-pregnene-21-dimethyl-acetal were dissolved in 152 ml of dry pyridine and, while stirring and cooling with ice, a mixture of 17.1 g of p-toluenesulfonic acid chloride and 152 ml of pyridine was added dropwise. The mixture was allowed to stand for 16 hours at room temperature, then concentrated to half its volume in vacuo and poured into 1.2 l of water. The precipitate was filtered off, washed to neutral with water and dried in vacuo over phosphorus pentoxide. 24 g of 15α-hydroxy-3,20,21-trioxo-$\Delta^4$-pregnene-15α-tosylate-21-dimethylacetal were obtained, m. p. 128°–131°C. Infrared bands: 1,710–1,720 $cm^{-1}$, 1,650–1,670 $cm^{-1}$, 1,610 $cm^{-1}$, 1,100 $cm^{-1}$, 1,070 $cm^{-1}$ and 1,160$^{-1}$, 185 $cm^{-1}$.

d. 3,20,21 d-trioxo-$\Delta^{4,14}$-pregnadiene-21-dimethyl-acetal 23.8 g of 15α-hydroxy-3,20,21-trioxo- $\Delta^4$-pregnene-15α-tosylate-21-dimethyl-acetal were dissolved in 472 ml of dry dimethyl-formamide, 31 g of anhydrous lithium carbonate were added and the solution was refluxed while stirring for 45 minutes under nitrogen atmosphere. After cooling, the solution was filtered off, the filtrate was concentrated to 120 ml, the pH was adjusted to 5 by means of about 4 ml of acetic acid and the reaction product was extracted with ethyl acetate. The extract was washed to neutral with water, dried over sodium sulfate and evaporated to dryness in vacuo. The residue was chromatographed on aluminum oxide for purification. Elution of the column successively with benzene, petroleum ether, benzene, benzene/methylene chloride and methylene chloride, yielded 12.6 g of 3,20,21-trioxo-$\Delta^{4,14}$-pregnadiene-21-methyl-acetall, m. p. 64°–66°C (after recrystallization from ether/petroleum ether). Infrared bands: 1,710–1,720 cm$^{-1}$, 1,650–1,670 cm$^{-1}$, 1,610 cm$^{-1}$, 1,100 cm$^{-1}$, 1,070 cm$^{-1}$.

EXAMPLE 2

3,20,21-trioxo-$\Delta^{4,14}$-pregnaidine-21-dimethyl-acetal

Under nitrogen atmosphere 1.4 g of 15α-hydroxy3,20,21-trioxo-$\Delta^4$-pregnene-15α-toxylate-21-dimethyl-acetal were refluxed in 14 ml of collidine for 30 minutes. After the usual work-up and subsequent purification (as disclosed in Example (1), 0.7 g of 3,20-,21-trioxo-$\Delta^{4,14}$-pregnadiene-21-dimethyl-acetal was obtained.

EXAMPLE 3 a.
15α-hydroxy-3,20,21-trioxo-$\Delta^4$-pregnene-15α-mesylate-21-dimethyl-acetal 1 g of 15α-hydroxy-3,20,21-trioxo-66$^4$-pregnene-21-dimethylacetal was dissolved in a mixture of 10 ml of dry acetone and 3.5 ml of dry pyridine. While stirring and cooling with ice, 1.18 g of methane-sulfonic acid chloride were added dropwise under a nitrogen atmosphere. After 7 hours at 0°C the solution was poured into 50 ml of water, the whole was extracted with methylene chloride, the extract was washed successively with dilute hydrochloric acid, sodium bicarbonate solution and water, dried over sodium sulfate and evaporated to dryness in vacuo, 1 g of amorphous 15α-hydroxy-3,20,21-trioxo-$\Delta^4$-pregnene-15α-mesylate-21-dimethylacetal was obtained. Infrared bands: 1,725 cm$^{-1}$, 1,650–1,670 cm$^{-1}$, 1,610 cm$^{-1}$, 1,165 cm$^{-1}$, 1,050 cm$^{-1}$ and 1,050–1,090 cm$^{-1}$.

b. 3,20,21-trioxo-$\Delta^{4,14}$-pregnadiene-21-dimethyl-acetal 10 ml of collidine were added to 1 g of 15α-hydroxy3,20,21-trioxo-$\Delta^4$-pregnene-15Δ-mesylate-21-dimethyl-acetal and the mixture was refluxed for 1½ hours under a nitrogen atmosphere. After the usual work-up and purification (as disclosed in Example 1), 0.524 g of 3,20,21-trioxo-$\Delta^{4,14}$-pregnadiene-21-dimethyl-acetal was obtained.

EXAMPLE 4

3,20,21-trioxo-$\Delta^{4,14}$-pregnadiene-21-dimethyl-acetal 1.14 g of 15α-hydroxy-3,20,21-trixoxo-$\Delta^4$-pregnene-15α-mesylate-21-dimethyl-acetal were dissolved in 10 ml of dimethyl-formamide, 1.4 g of anhydrous lithium carbonate were added and the whole was refluxed for 30 minutes while stirring under a nitrogen atmosphere. After the usual work-up and purification (as disclosed in Example 1) 0.782 g of 3,20,21-trioxo- $\Delta^{4,14}$-pregnadiene-21-diomethylacetal was obtained.

What is claimed is:

1. A $\Delta^{14}$-20-keto-21-acetal steroid of the formula

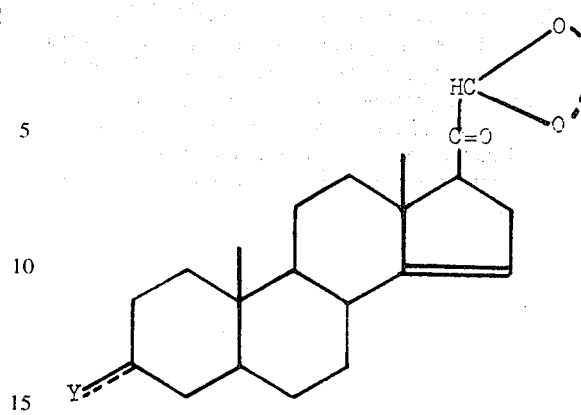

and corresponding compounds having a $\Delta^4$-unsaturation, wherein Y is a member selected from the group consisting of oxo; oxo ketalized with a monohydric or dihydric aliphatic alcohol or benzyl alcohol;

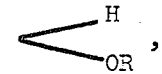

wherein R is lower alky, cyclohexyl, aralkyl, or tetrahydropyranyl; and

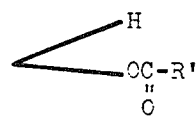

wherein

is aliphatic acyl having 1 – 20 carbon atoms, benzoyl, phenylacetyl, or cyclohexane-carbonyl; and wherein

is selected from the group consisting of acyclic acetals of lower alkanols or benzyl alcohol and cyclic acetals of dihydric alkanols haviong 2 – 5 carbon atoms.

2. 3,20,21-trioxo-$\Delta^{4,14}$-pregnadiene-21-dimethylacetal.

3. A process for the manufacture of a $\Delta^{14}$-20-keto21-dialkoxy steroid as defined in claim 1 which comprises
A. oxidizing a 20-keto-15α, 21-dihydroxy steroid of the formula

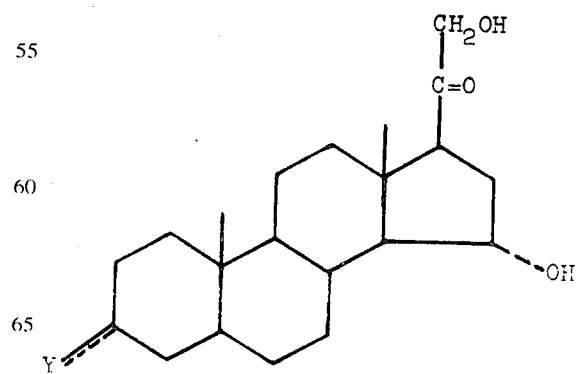

where Y is defined as in claim 1, with an oxidizing agent selected from the group consisting of copper (II) acetate, air, and oxygen, the two last-mentioned agents being used in the presence of an oxidation catalyst;

B. reacting the 15α-hydroxy-20-keto-21-oxo steroid thus obtained with a lower alkanol or benzyl alcohol, or with a dihydric alkanol having 2 – 5 carbon atoms, in the presence of an acid catalyst to form the corresponding 21-acetal;

C. reacting the resulting 15α-hydroxy-20-keto-21-acetal steroid with a sulfonic acid halide to form the corresponding 15-sulfonic acid ester; and D. cleaving sulfonic acid from the molecule in the presence of a base.

* * * * *